United States Patent [19]

Cutright

[11] Patent Number: 4,946,338
[45] Date of Patent: Aug. 7, 1990

[54] TUBE HOLDING OR GUIDING APPARATUS
[75] Inventor: Edwin L. Cutright, Powhatan, Va.
[73] Assignee: Philip Morris Incorporated, New York, N.Y.
[21] Appl. No.: 408,606
[22] Filed: Sep. 18, 1989
[51] Int. Cl.$^5$ .............................................. B65G 51/00
[52] U.S. Cl. ................................ 414/745.1; 406/153; 406/194; 193/32; 198/345; 198/493; 131/84.1; 131/84.3; 493/44; 493/48
[58] Field of Search ............... 414/745.1, 903; 406/86, 406/88, 89, 151, 153, 194; 198/345, 493; 193/32; 131/84.1, 84.3; 493/44, 48

[56] References Cited
U.S. PATENT DOCUMENTS 3,139,972  7/1964  Kochalski ..................... 131/84.3
3,810,475  5/1974  Labbe .......................... 131/84.3
4,616,662 10/1986  Hartmann ..................... 131/84.1
4,776,731 10/1988  Briggs ......................... 406/153

Primary Examiner—David A. Bucci
Assistant Examiner—Craig Slavin
Attorney, Agent, or Firm—Robert R. Jackson

[57] ABSTRACT

A tube is held or guided parallel to its length by providing a channel-like structure aligned with the tube and having sides which are spaced apart by a distance less than the diameter of the tube. Circumferentially spaced longitudinal portions of the outer surface of the tube bear respectively on the two sides of the channel. The channel is open to the outer surface of the tube between those longitudinal portions, and the bottom of the tube is spaced from the outer surface of the tube between those longitudinal portions. The tube is held against the channel-like structure by directing a stream of gas (e.g., air) along the channel.

3 Claims, 2 Drawing Sheets

TUBE HOLDING OR GUIDING APPARATUS

BACKGROUND OF THE INVENTION

This invention relates to apparatus for handling tubular articles such as cigarettes, tubular cigarette components, spiral wound paper and/or foil tubes, etc., and more particularly to apparatus for holding or guiding such articles parallel to their length.

There are many instances in tube making or handling where a tube must be held or guided parallel to its length. For example, in the typical cigarette making machine, the tobacco rod is initially formed as a continuous tobacco-filled paper tube which moves continuously parallel to its length as it is made. The end portion of this tube is periodically cut off to form cut lengths of tube (e.g., by a conventional Molins Mark VIII cutter head available from Molins of London, England). Each successive cut length is then accelerated parallel to its length (e.g., by the spiral spacer wheel in a conventional Molins Mark VIII cutter head) in order to place the cut length in the next successive flute on a fluted catcher drum which is rotating about an axis parallel to the longitudinal axis of the initial continuous rod. From that point on, the cut lengths tend to move transverse to their longitudinal axes (e.g., for such purposes as the addition of filters).

Between the point at which the cutter head cuts the tube and the point at which the spiral spacer wheel takes over control of the cut length in order to accelerate it into a catcher drum flute, the cut length of tube must be kept under control so that it remains in line—pushed along by the tube behind—but so that it can be freely accelerated once it reaches the spiral spacer wheel. The spiral spacer wheel also typically deflects the path of the tube slightly transverse to its longitudinal axis in order to facilitate insertion of the tube into the next catcher drum flute. The tube controlling elements must therefore not be so rigid or inflexible as to prevent this necessary tube deflection.

Heretofore the typical means for controlling the cut lengths of tube from the point at which they are cut to the point at which they come under control of the spiral spacer wheel have been spring fingers which resiliently press the tube against tube-supporting and guiding surfaces. Such spring fingers tend to be delicate, easily damaged when the machine jams or when a jam is being cleared, and difficult to adjust for optimum performance.

Although the foregoing shortcomings of the prior art have been described in the context of handling tobacco-filled rods, the same problems may be encountered in handling tubes of other kinds. For example, in making spiral wound tubes of paper and/or foil as shown, for example, in Meyer U.S. Pat. No. 4,473,368, it is sometimes necessary to guide the cut off lengths of tube in a manner similar to that described above, so that the above-mentioned shortcomings of the prior art are encountered again.

In view of the foregoing, it is an object of this invention to provide improved and simplified tube holding or guiding apparatus.

It is a more particular object of this invention to provide tube holding or guiding apparatus which is extremely reliable, robust, and easy to adjust.

SUMMARY OF THE INVENTION

These and other objects of the invention are accomplished in accordance with the principles of the invention by providing apparatus for holding a tube on a predetermined path parallel to the longitudinal axis of the tube comprising: a first surface parallel to said path for contacting a first longitudinal portion of the outer surface of said tube; a second surface parallel to said path for contacting a second longitudinal portion of the outer surface of said tube which is circumferentially spaced from said first portion, the circumferential spacing being less than 180°; a longitudinal channel between said first and second surfaces, said channel extending parallel to said path and opening toward the outer surface of said tube between said first and second longitudinal portions, the bottom of said channel being spaced from the outer surface of said tube; and means for directing a stream of gas (e.g., air) longitudinally along said channel to hold said first and second portions against said first and second surfaces respectively.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
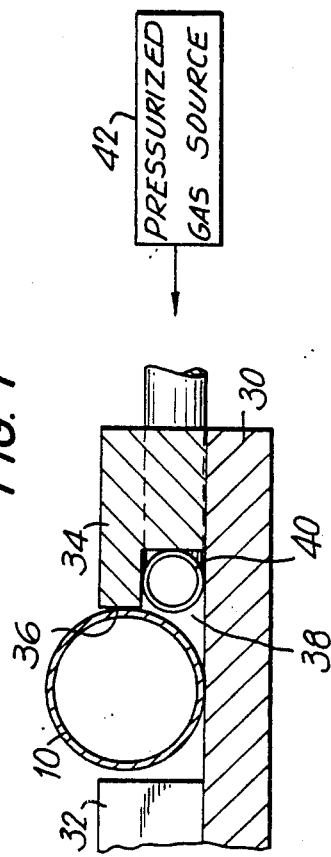
FIG. 1 is a partial cross sectional view (taken along the line 1—1 in FIG. 2) of an illustrative embodiment of apparatus constructed in accordance with the principles of this invention.
Figure 2:
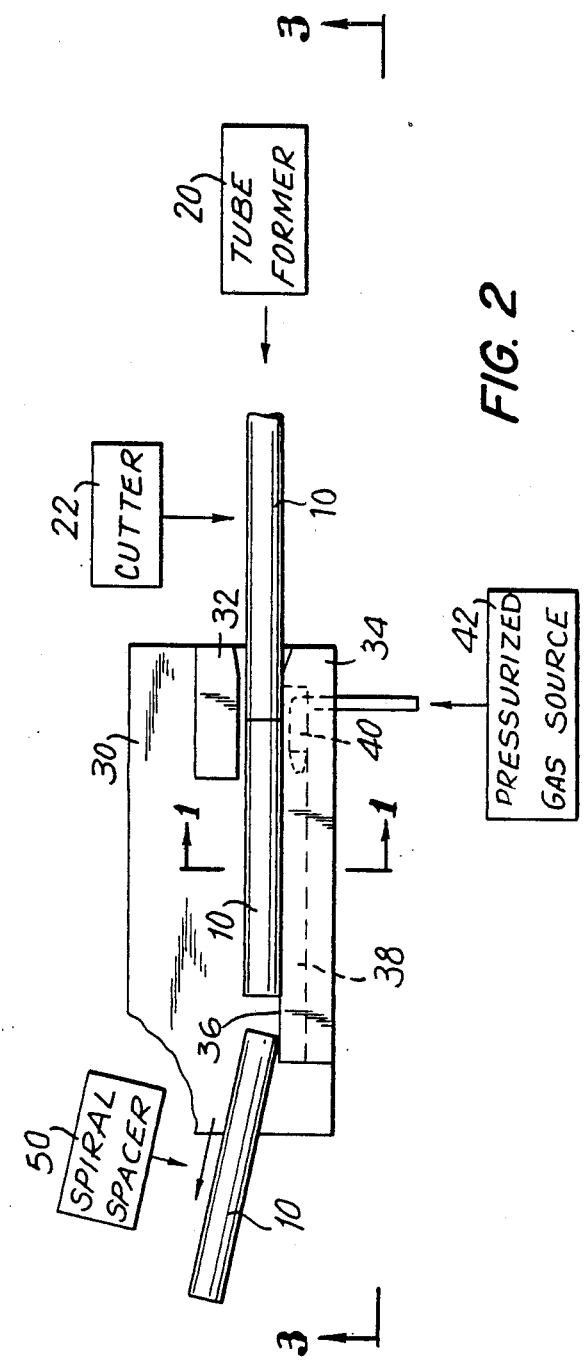
FIG. 2 is a plan view of the apparatus shown in FIG. 1.
Figure 3:
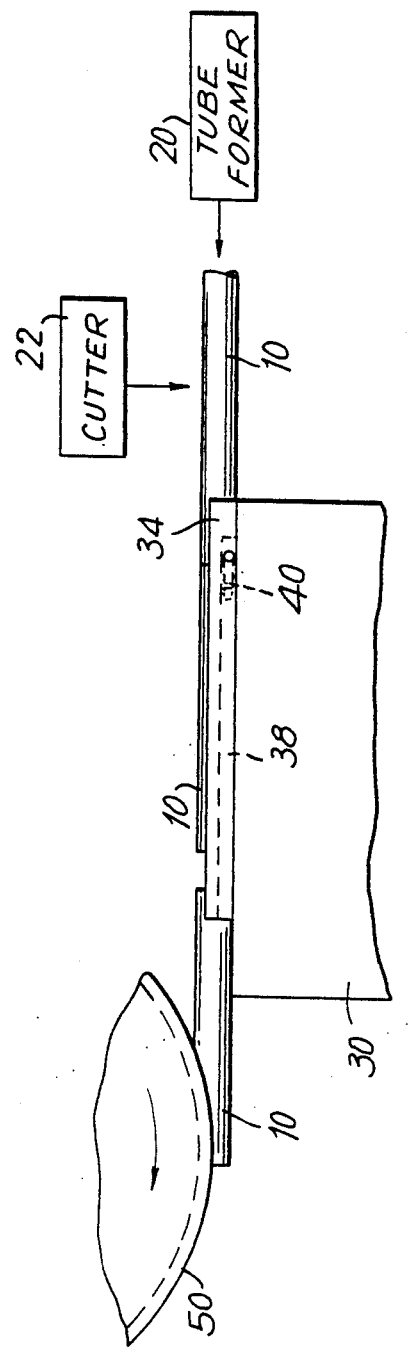
FIG. 3 is an elevational view taken along the line 3—3 in FIG. 2.

In the illustrative embodiment shown in FIGS. 1-3 tube 10 is formed and advanced continuously by conventional tube former 20 (e.g., a conventional garniture or spiral tube winder). Conventional cutter 22 operates periodically to cut tube 10 into predetermined lengths. After passing cutter 22, tube 10 passes between guides 32 and 34 on table 30. Guide 32 is relatively short parallel to the longitudinal axis of tube 10, but guide 34 extends much farther in that direction toward conventional spiral spacer 50. As each cut length of tube 10 passes from cutter 22 to spiral spacer 50 it is supported by table 30. In addition, a longitudinal portion of the circumference of each cut length of tube 10 spaced from the surface of table 30 bears against surface 36 of guide 34. Between surface 36 and the surface of table 30 guide 34 is recessed away from the surface of tube 10 to define (with table 30) a channel 38 which (1) extends parallel to the longitudinal axis of tube 10, and (2) opens toward the circumferential surface of tube 10. It should be noted that surface 36 is spaced less than 180° around tube 10 from the portion of the surface of table 30 which also contacts the tube. In particular, in the depicted embodiment, surface 36 is spaced approximately 90° around tube 10 from the portion of the surface of table 30 which also contacts the tube.

Disposed in the upstream portion of channel 38 is a gas discharge nozzle 40 which is directed in the downstream direction (i.e., substantially parallel to the longitudinal axis of tube 10 and in the direction of motion of tube 10). Nozzle 40 directs a flow of gas (e.g., air) from pressurized gas source 42 along channel 38 parallel to the direction of motion of tube 10. This gas flow, by operation of the Bernoulli effect, has the tendency to pull tube 10 in toward channel 38, thereby holding the tube against surface 36 and the surface of table 30. Tube 10 is thereby guided parallel to surface until spiral spacer 50 takes over control of the tube. In particular, as is conventional, spiral spacer 50 accelerates each cut length of tube 10 and deflects it somewhat transverse to its initial direction of motion in order to put each cut length into the next succeeding flute in a conventional fluted transport drum (not shown). The force exerted on tube 10 by the gas stream from nozzle 40 is great enough to hold each cut length of tube 10 against surface 36 and table 30 as each cut length is pushed along by the succeeding tube, but that force is not so great as to interfere with the operation of spiral spacer 50. In other words, as soon as each cut length of tube 10 reaches spiral spacer 50, the spiral spacer can easily longitudinally accelerate and transversely deflect that cut length in the desired manner, thereby taking over control of the continued motion of the cut length.

Because each cut length of tube 10 is held to the guiding surfaces by differential gas pressure (i.e., the above-mentioned Bernoulli effect), there are no spring fingers to impede clearance of any possible jam or to become damaged, worn, or out of adjustment. Moreover, unlike spring fingers, which it may be difficult to optimally adjust, the apparatus of this invention is easily and precisely adjustable by control of the gas flow through nozzle 40.

It will be understood that the foregoing is merely illustrative of the principles of this invention, and that various modifications can be made by those skilled in the art without departing from the scope and spirit of the invention. For example, tube 10 may be any of a wide variety of tubes formed of various materials by various tube former devices.

What is claimed is:

1. Apparatus for holding a tube on a predetermined path parallel to the longitudinal axis of the tube comprising:
   a first surface parallel to said path for contacting a first longitudinal portion of the outer surface of said tube;
   a second surface parallel to said path for contacting a second longitudinal portion of the outer surface of said tube which is circumferentially spaced from said first portion, the circumferential spacing between said first and second portions being less than 180°;
   a longitudinal channel between said first and second surfaces, said channel extending longitudinally parallel to said path and opening toward the outer surface of said tube between said first and second longitudinal portions, the bottom of said channel being spaced from the outer surface of said tube; and
   means for directing a stream of gas longitudinally along said channel to hold said first and second portions against said first and second surfaces, respectively.

2. The apparatus defined in claim 1 wherein said tube is moving in a predetermined direction along said path, and wherein said means for directing directs said stream of gas in the same direction along said channel.

3. The apparatus defined in claim I wherein the circumferential spacing between said first and second portions is approximately 90°.

* * * * *